(12) United States Patent
Joglekar et al.

(10) Patent No.: US 10,817,935 B1
(45) Date of Patent: Oct. 27, 2020

(54) SYSTEM AND METHOD FOR INCREASING CREDIT WORTHINESS OF ACCOUNT HOLDERS

(71) Applicant: JPMorgan Chase Bank, N.A., New York, NY (US)

(72) Inventors: Ajinkya P. Joglekar, Philadelphia, PA (US); Manning R. Field, Media, PA (US)

(73) Assignee: JPMorgan Chase Bank, N.A., New York, NY (US)

( * ) Notice: Subject to any disclaimer, the term of this patent is extended or adjusted under 35 U.S.C. 154(b) by 657 days.

(21) Appl. No.: 14/790,417

(22) Filed: Jul. 2, 2015

(51) Int. Cl.
*G06Q 40/02* (2012.01)

(52) U.S. Cl.
CPC .................................. *G06Q 40/025* (2013.01)

(58) Field of Classification Search
CPC ............................. G06Q 40/025; G06Q 40/02
See application file for complete search history.

(56) References Cited

U.S. PATENT DOCUMENTS

| | | | |
|---|---|---|---|
| 4,973,828 A * | 11/1990 | Naruse | G06K 19/07703 235/380 |
| 5,590,038 A * | 12/1996 | Pitroda | G06Q 20/02 705/41 |
| 6,000,832 A | 12/1999 | Franklin et al. | |
| 6,006,988 A | 12/1999 | Behrmann et al. | |
| 6,009,415 A | 12/1999 | Shurling et al. | |
| 6,012,049 A | 1/2000 | Kawan | |
| 6,014,634 A | 1/2000 | Scroggie et al. | |
| 6,016,482 A | 1/2000 | Molinari et al. | |
| 6,018,718 A | 1/2000 | Walker et al. | |
| 6,029,139 A | 2/2000 | Cunningham et al. | |
| 6,047,067 A | 4/2000 | Rosen | |
| 6,049,782 A | 4/2000 | Gottesman et al. | |
| 6,058,378 A | 5/2000 | Clark et al. | |
| 6,061,660 A | 5/2000 | Eggleston et al. | |
| 6,064,985 A | 5/2000 | Anderson | |
| 6,070,067 A | 5/2000 | Nguyen et al. | |
| 6,076,068 A | 6/2000 | Delapa et al. | |
| 6,076,072 A | 6/2000 | Libman | |
| 6,078,891 A | 6/2000 | Riordan et al. | |
| 6,085,976 A | 7/2000 | Scher | |

(Continued)

OTHER PUBLICATIONS

Orla O Sullivan, "Biometrics" Jan. 1997, American Bankers Association, ABA Banking Journal, 89, 1 (Year: 1997).*

(Continued)

*Primary Examiner* — Kenneth Bartley
(74) *Attorney, Agent, or Firm* — Hunton Andrews Kurth LLP

(57) ABSTRACT

The invention relates to a digital card comprising: a memory that stores data associated with an account and a user; a sensor that detects a user's fingerprint to identify the user; a display on the digital card that displays an identification associated with the user and a card number upon activation of the digital card responsive to the user's fingerprint; a microprocessor, coupled to the memory, sensor and the display, programmed to perform the following: monitor spend activity on the digital card; determine the user's credit worthiness based at least in part on the monitored spend activity; and automatically update the display on the digital card responsive to the user's credit worthiness and spend activity.

16 Claims, 10 Drawing Sheets

(56) References Cited

U.S. PATENT DOCUMENTS

| | | | |
|---|---|---|---|
| 6,089,284 A | 7/2000 | Kaehler et al. | |
| 6,105,006 A | 8/2000 | Davis et al. | |
| 6,105,008 A | 8/2000 | Davis et al. | |
| 6,108,642 A | 8/2000 | Findley | |
| 6,112,190 A | 8/2000 | Fletcher et al. | |
| 6,115,458 A | 9/2000 | Tasketi | |
| 6,119,103 A | 9/2000 | Basch et al. | |
| 6,119,933 A | 9/2000 | Wong et al. | |
| 6,776,332 B2* | 8/2004 | Allen | G06Q 20/108 235/379 |
| 6,925,439 B1* | 8/2005 | Pitroda | G06Q 20/02 235/380 |
| 6,954,133 B2* | 10/2005 | McGregor | G05B 19/0425 340/5.26 |
| 7,392,224 B1 | 6/2008 | Bauer et al. | |
| 7,398,241 B2 | 7/2008 | Fay et al. | |
| 7,401,731 B1 | 7/2008 | Pletz et al. | |
| 7,406,442 B1 | 7/2008 | Kotimeier, Jr. et al. | |
| 7,461,028 B2 | 12/2008 | Wronski, Jr. | |
| 7,467,096 B2 | 12/2008 | Antonucci et al. | |
| 7,502,758 B2 | 3/2009 | Burke | |
| 7,506,806 B2 | 3/2009 | Bonalle et al. | |
| 7,512,551 B2 | 3/2009 | Postrel | |
| 7,523,385 B2 | 4/2009 | Nguyen et al. | |
| 7,580,857 B2 | 8/2009 | Van Fleet et al. | |
| 7,587,363 B2 | 9/2009 | Cataline et al. | |
| 7,606,730 B2 | 10/2009 | Antonucci | |
| 7,607,583 B2* | 10/2009 | Berardi | G06K 7/0008 235/380 |
| 7,613,629 B2 | 11/2009 | Antonucci et al. | |
| 7,689,504 B2 | 3/2010 | Warren et al. | |
| 7,729,925 B2 | 6/2010 | Maritzen et al. | |
| 7,747,525 B2 | 6/2010 | Grant et al. | |
| 7,753,259 B1 | 7/2010 | Taylor et al. | |
| 7,766,244 B1 | 8/2010 | Field | |
| 8,078,528 B1 | 12/2011 | Vicente et al. | |
| 8,190,522 B1 | 5/2012 | Vicente et al. | |
| 8,191,788 B2* | 6/2012 | Morrill-Webb | B41M 3/14 235/487 |
| 8,538,826 B1 | 9/2013 | Lai et al. | |
| 8,554,652 B1 | 10/2013 | Vicente et al. | |
| 8,566,187 B2* | 10/2013 | Keld | G06Q 10/10 705/30 |
| 8,706,625 B2 | 4/2014 | Vicente et al. | |
| 8,725,611 B1 | 5/2014 | Vicente et al. | |
| 8,851,370 B2 | 10/2014 | DiMuro et al. | |
| 9,058,627 B1* | 6/2015 | Wasser | G06F 3/0482 |
| 9,195,975 B2* | 11/2015 | Pochic | G06Q 20/409 |
| 9,400,589 B1* | 7/2016 | Wasser | G06F 3/0482 |
| 9,483,920 B1* | 11/2016 | Anderson | G08B 5/36 |
| 9,569,797 B1* | 2/2017 | Rohn | G06Q 40/025 |
| 9,830,646 B1* | 11/2017 | Wasser | G06Q 40/00 |
| 10,255,598 B1* | 4/2019 | Dean | G06Q 20/00 |
| 10,510,070 B2* | 12/2019 | Wurmfeld | G06Q 20/3563 |
| 2002/0070279 A1* | 6/2002 | Zausner | G06K 7/0013 235/490 |
| 2002/0095586 A1* | 7/2002 | Doyle | G06F 21/32 713/186 |
| 2002/0095587 A1* | 7/2002 | Doyle | G06Q 20/341 713/186 |
| 2002/0095601 A1* | 7/2002 | Hind | H04L 9/3231 726/22 |
| 2003/0055689 A1* | 3/2003 | Block | G06Q 10/02 705/5 |
| 2004/0117300 A1* | 6/2004 | Jones | G06Q 20/10 705/39 |
| 2004/0124246 A1* | 7/2004 | Allen | G06Q 20/108 235/492 |
| 2004/0171406 A1* | 9/2004 | Purk | G06K 7/006 455/558 |
| 2005/0240528 A1* | 10/2005 | Hendrick | G06K 19/0723 705/44 |
| 2006/0031158 A1* | 2/2006 | Orman | G06Q 20/24 705/38 |
| 2006/0107067 A1* | 5/2006 | Safal | G07C 15/005 713/186 |
| 2007/0179902 A1* | 8/2007 | John | G06Q 10/06 705/62 |
| 2007/0235539 A1* | 10/2007 | Sevanto | G06K 7/10237 235/451 |
| 2009/0309701 A1* | 12/2009 | Peled | G06Q 20/341 340/5.83 |
| 2010/0227672 A1* | 9/2010 | Amour | G06Q 20/10 463/25 |
| 2010/0270370 A1* | 10/2010 | Cowcher | G07F 7/1008 235/379 |
| 2011/0202414 A1* | 8/2011 | Nallasivan | G06Q 20/105 705/17 |
| 2011/0284632 A1* | 11/2011 | Mullen | G06Q 20/352 235/380 |
| 2011/0320342 A1* | 12/2011 | Kremen | G06Q 40/025 705/38 |
| 2012/0197691 A1* | 8/2012 | Grigg | G06Q 20/20 705/14.1 |
| 2013/0080238 A1* | 3/2013 | Kelly | G07F 17/3255 705/14.31 |
| 2013/0185189 A1* | 7/2013 | Stewart | G06Q 40/02 705/38 |
| 2013/0222349 A1* | 8/2013 | Baek | G06F 15/0241 345/204 |
| 2013/0318592 A1* | 11/2013 | Grier, Sr. | H04L 9/3234 726/9 |
| 2014/0040125 A1* | 2/2014 | Kunz | G06Q 20/105 705/41 |
| 2014/0058941 A1* | 2/2014 | Moon | G06Q 20/322 705/42 |
| 2014/0114735 A1* | 4/2014 | Isaacson | G06Q 20/42 705/14.23 |
| 2014/0156501 A1* | 6/2014 | Howe | G06Q 40/025 705/38 |
| 2014/0279208 A1* | 9/2014 | Nickitas | G06Q 30/0631 705/26.7 |
| 2015/0023604 A1* | 1/2015 | Mitchell | G06K 9/00449 382/217 |
| 2015/0149308 A1* | 5/2015 | Lin | G06Q 30/0238 705/16 |
| 2015/0262052 A1* | 9/2015 | Pahuja | G06Q 20/341 340/10.52 |
| 2016/0012465 A1* | 1/2016 | Sharp | G06Q 20/18 705/14.17 |
| 2016/0247233 A1* | 8/2016 | Page | G06Q 40/06 |
| 2016/0358250 A1* | 12/2016 | Dogin | G06Q 40/025 |
| 2017/0228820 A1* | 8/2017 | Rohn | G06Q 40/025 |

OTHER PUBLICATIONS

Pranav Sharma, "An Evaluation of E-Payment Systems and Their Application in Mobile Commerce," Dec. 13, 2004, University of Ottawa, pp. 1-146. (Year: 2004).*

\* cited by examiner

SYSTEM AND METHOD FOR INCREASING CREDIT WORTHINESS OF ACCOUNT HOLDERS

RELATED APPLICATIONS

The application is related to co-pending applications, U.S. application Ser. No. 14/790,222 (titled "System and Method for Implementing Payment with a Mobile Payment Device") and U.S. application Ser. No. 14/790,141 (titled "System and Method for Assisting Customers Achieve Purchase Goals"), both filed concurrently on Jul. 2, 2015, the contents of which are incorporated herein in their entirety.

FIELD OF THE INVENTION

The invention relates generally to a system and method for increasing the credit worthiness of account holders, and more particularly to a system and method for providing automated recommendations, educational materials, and feedback to account holders to assist them in enhancing their credit worthiness.

BACKGROUND

Individuals who are first time card holders, just entering the work force, or have no established credit behavior, typically do not have many choices for obtaining a credit card. In some cases, they may need to start with a prepaid card or debit card before being offered a credit card. The first credit card they are offered may provide them with only a small credit limit and few other features or benefits. Hence, the card holder may perceive the card to be less than desirable and may wish to close the account as soon as a better, more prestigious credit card is available. In such case, the issuing bank may lose a customer with good long term potential.

Some younger generation individuals may also have difficulty establishing a good credit score because they are not familiar with the types of specific behaviors that are relevant to the calculation of a credit score. Hence, out of ignorance, they engage in spending and payment practices that do little to enhance their credit score, or that in fact decrease their credit score. This type of behavior increases the likelihood that such account holder will jump to a different financial institution in pursuit of a better card.

Current systems therefore leave much to be desired in terms of assisting and coaching younger card holders in engaging in behaviors to steadily increase their credit score, be eligible for better card products, and retaining customers over the long term.

SUMMARY

According to one embodiment, the invention relates to a computer-implemented system and method for helping customers build up their credit score and financial knowledge through tips, personalized message, coaching and actionable data from their transactions and data from their peer set. The method may be conducted on a specially programmed computer system comprising one or more computer processors, mobile devices, electronic storage devices, and networks.

The invention also relates to a computer implemented system for helping customers build up their credit score, and to a computer readable medium containing program instructions for executing a method for increasing the creditworthiness of an account holder. According to an embodiment of the present invention, the system includes a digital card comprising: a memory that stores data associated with an account and a user; a sensor that detects a user's fingerprint to identify the user; a display on the digital card that displays an identification associated with the user and a card number upon activation of the digital card responsive to the user's fingerprint; a microprocessor, coupled to the memory, sensor and the display, programmed to perform the following: monitor spend activity on the digital card; determine the user's credit worthiness based at least in part on the monitored spend activity; and automatically update the display on the digital card responsive to the user's credit worthiness and spend activity.

According to the system of an embodiment of the present invention, the digital card is linked to a mobile device of the user and further linked to the user's financial account. The mobile device provides customized recommendation for spending with the digital card and also display educational information for achieving credit goals.

According to another embodiment of the present invention, a mobile device that provides credit worthiness data to a user based on user transaction data, comprises: a memory that stores data associated with an account and a user; a microprocessor, coupled to the memory, programmed to perform the following: detect spend activity on a customer payment instrument associated with the mobile device; identify the user's credit worthiness based at least in part on the monitored spend activity; provide customized education information concerning the user's credit worthiness; and automatically identify customized recommendations for spend, responsive to the user's credit worthiness and spend activity.

The computer implemented system, method and medium described herein can provide the advantage of helping account holders reach financial goals, according to various embodiment of the invention. Another advantage that can be provided is customer loyalty and retention due to the increased satisfaction of the account holder. The system provides a customized digital card that changes as the customer matures and evolves. That type of experience may enhance loyalty to the financial institution much more than a conventional credit or debit card with base level benefits and a low credit line. These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION

Figure 1:
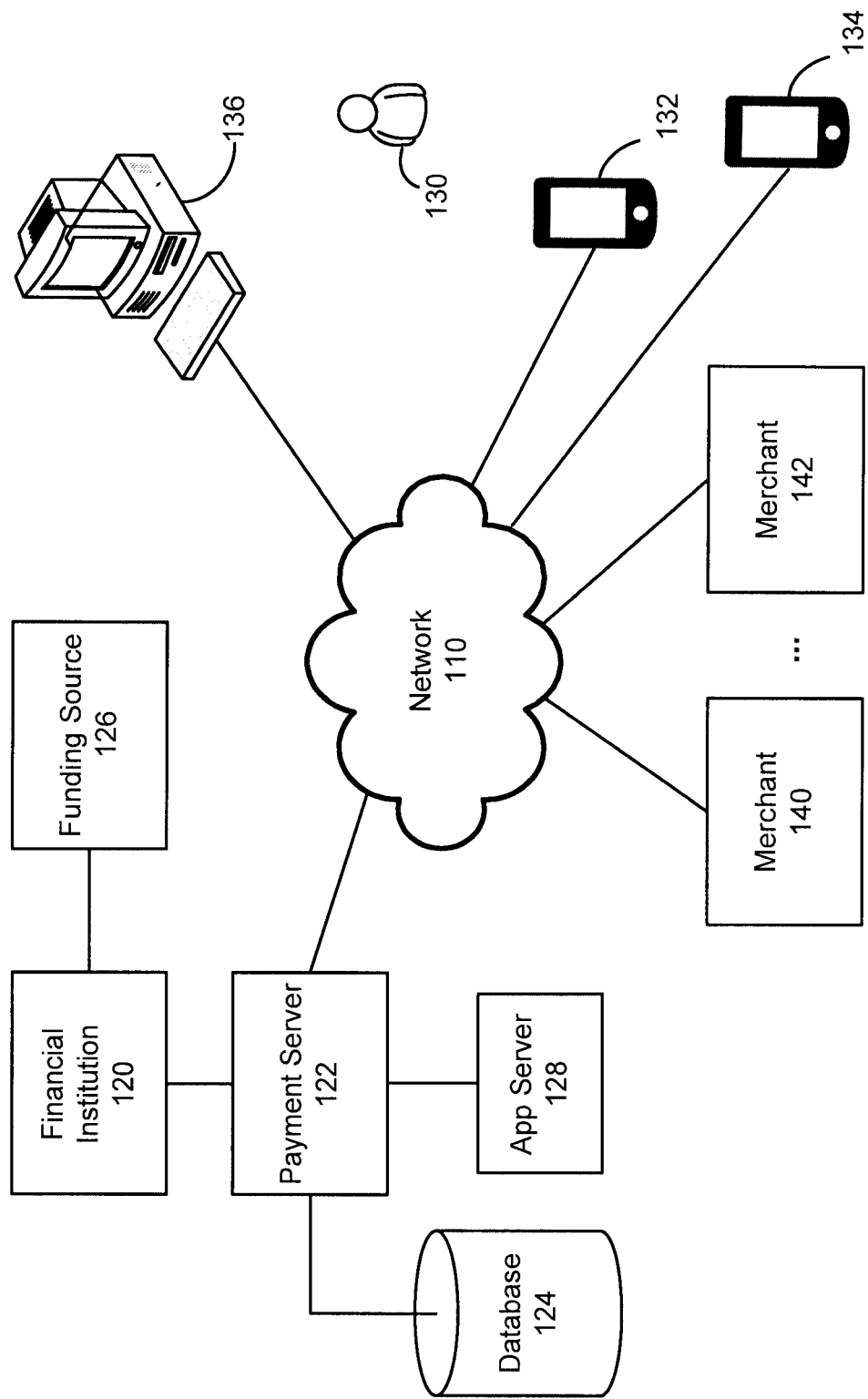
FIG. 1 is a diagram of a system for increasing the creditworthiness of an account holder according to an exemplary embodiment of the invention.

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to helping customers build up their credit score and financial knowledge through tips, personalized message, coaching and actionable data from their transactions and data from their peer set. According to an embodiment of the present invention, a system and method provides automated recommendations, educational materials, and feedback to account holders to assist them in enhancing their credit worthiness. An embodiment of the present invention is directed to a physical payment mechanism (e.g., a digital card) that adjusts as the customer spends, matures and evolves. For example, a new customer may start off with a basic credit card and in response to the customer's spending habits and good credit history, the basic credit card can evolve into a customized credit card with powerful benefits. The digital card may also pair with a mobile device of the customer to enable quick, real-time feedback in-store and peer-to-peer payments.

An embodiment of the present invention is directed to a digital card that grows with the customer, with timely content on building credit, healthy spending habits and getting the most out of the card. As a customer builds his credit, the customer may level up to more sophisticated modifications to the digital card with higher spend limits, better benefits, and new goal-setting features. Cardholders may also receive progress notifications and alerts to keep the cardholder on track.

For example, a customer may start off with a basic blank digital card. Upon customer recognition (e.g., fingerprint recognition, voice recognition, facial recognition, swipe pattern, etc.), the digital card will get activated. Other types of recognition and/or authentication may be implemented.

By placing a customer's thumb on the digital card, the customer's card will turn on. The customer's name, credit card number, expiration date may be displayed. When the customer makes a payment for a purchase, the digital card may temporarily change to another color, e.g., green, to indicate that the payment was successful. While the customer may be currently at a first level, the digital card may display a progress graphic that indicates that the customer is close to reaching a second level. When the customer reaches the second level, the customer may be notified that he or she has been upgraded to the next level based on customer usage and prompt payments. The customer may be informed that the digital card now has a credit limit (e.g., $500) as well as other benefits and features.

The customer may also view tips, message, informational videos, etc. that explain credit limit and provides advice on how to build a good credit score. This educational information may be displayed on the customer's mobile device, tablet, wearable, etc. Based on the customer profile and/or other information, other goals and aspirations may be integrated. When the customer activates the digital card (e.g., by placing his thumb or other finger on the corner of the card), the digital card may display in a different color to indicate that the digital card now has level 2 benefits and features. Other biometrics may be used to activate the digital card. Other graphical modifications and/or displays may be implemented. According to another example, an icon, graphic, message and/or animation may appear on the digital card to indicate that the card is now upgraded to a new level.

Other functionality may be provided. For example, the customer may perform banking transactions, e.g., funds transfers, using the customer's mobile device or phone. The customer may receive funds from another card or funding source as well as transfer funds to another card or recipient. In this exemplary scenario, another user may tap a NFC-enabled card to the customer's mobile device and a funds transfer may occur. Additional details and status information may also be provided.

FIG. 1 is a diagram of a system for increasing the creditworthiness of an account holder according to an exemplary embodiment of the invention. As shown in FIG. 1, the system may include one or more computer servers and networks. The system may be provided by a business or entity that has access to relevant information to enhance the card holder's experience. According to one embodiment, the system is operated and maintained by a financial institution such as retail bank using, in part, data on its retail bank customers, e.g., card holders of credit and debit cards issued by the retail bank.

As shown in FIG. 1, a customer or user 130 may access a network 110 via various devices, including mobile device 132, 134, computer 136 as well as other communication and processing devices, including wearables, etc. The customer may access a mobile app or other program that runs on a mobile device, computer or other processing device that enables a customer to access a merchant program. According to an embodiment of the present invention, the customer may receive a digital card that is linked to the mobile device of the customer.

Also shown in FIG. 1 is an account holder 130 of the financial institution who may communicate electronically with a financial institution 120 using a mobile device 132, 134 and a personal computing device 136. The mobile device 132, 134 may be a smart phone, such as an Apple iPhone, Samsung Galaxy, or Amazon Fire Phone, that includes a touch screen or other interactive display. The mobile device 132, 134 may also include other hardware and software enabling them to communicate using other communication channels, such as a near field communication (NFC) signals or a Bluetooth signals. The mobile device 132, 134 also typically includes hardware and software to enable communication with a cellular network and WiFi network. The personal computing device 136 may comprise a laptop computer, tablet computer, or desktop computer, for example. The account holder 130 may use the personal computing device 136 to execute various online transactions with the financial institution 120 at home or elsewhere.

An embodiment of the present invention may be provided by various entities, such as a financial institution, service provider, merchant, etc. For example, a merchant app may be offered by a merchant, represented by Merchant 140, 142, or a third party service provider. The customer may also access a payment system provided by a financial institution 120 such as a retail bank, according to one embodiment of the invention. The payment system may be embodied primarily or entirely in a payment server 122 (which may include one or more databases represented by 124) owned and/or operated by the financial institution 120 that interfaces with a number of other servers and entities via one or more networks.

Payment server 122 enables user or account holder 130 to make payments by interfacing with other servers owned and/or operated by the financial institution 120 and/or other entities. The app server 128 may interface with other servers owned and/or operated by the financial institution. For example, payment server 122 may interface with a credit card server and associated database that stores and processes credit card transactions for credit card holders of the financial institution 120. Payment server 122 may also interface with a rewards program server and associated database that stores and processes rewards information for account holders at the financial institution 120. The foregoing description is merely one example of a configuration for such functions and is not intended to be limiting.

Various embodiments of the invention may also utilize an established payment network such as the VISA network, MasterCard network, NYCE network, or other similar network to transmit information between various entities using the system. For example, payment server 122 may use the VISA network for authorization and settlement of transactions. However, use of such established credit and debit networks is not required according to various embodiments of the invention. Payment Server 122 may be configured to use other networks for executing payment transactions and transmitting information to the cardholders, merchants, and financial institutions. Payments can be made by rendering such other payment network's digital tender on the mobile device 132, 134.

Referring again to FIG. 1, the network 110 enables communications between various computing devices and storage devices in the system. The network 110 may comprise one or more of the Internet, a wide area network (WAN), a local area network (LAN), and/or an intranet, according to various embodiments of the invention. The network 110 may also comprise, include, or interface to any one or more other communication channels or devices, such as a digital T1, T3, E1 or E3 line, a digital subscriber line (DSL) connection, an Ethernet connection, an integrated services digital network (ISDN) line, a WiFi connection, Bluetooth connection, a Wireless Application Protocol (WAP) link, a Global System for Mobile Communication (GSM) link, a Global Positioning System (GPS) link, a cellular digital packet data (CDPD) link, or a satellite communication channel, for example.

As shown in FIG. 1, a user 130 may use a mobile device 132, 134 to make purchases offered or provided by a merchant or other service or product provider. For example, the mobile device 132, 134 may include a mobile app that enables the user to make purchases. The user's ability to make purchases may be funded from a funding source 126. For example, a funding source may be funded by a financial institution in the form of points, credit and/or other metric or currency. Funding source 126 may be specific to one customer. Also, a funding source may be for a family of customers or a group of customer where points and benefits may be shared, allocated and/or distributed to the members.

Having described an example of the hardware, software, and data that can be used to run the system, an example of the method and customer experience will now be described. The method will be described primarily as an example in which a customer downloads a software application (sometimes referred to as an "app") and uses it for accumulating points and/or making purchases. However, those skilled in the art will appreciate that the principles of the invention can be applied to related circumstances, such as where the entity providing the app is a business other than a merchant, or where the merchant app functionality is provided through a browser on the customer's mobile device rather than through a software application (app) downloaded to the customer's mobile device, and with purchases from various providers.

Figure 2:
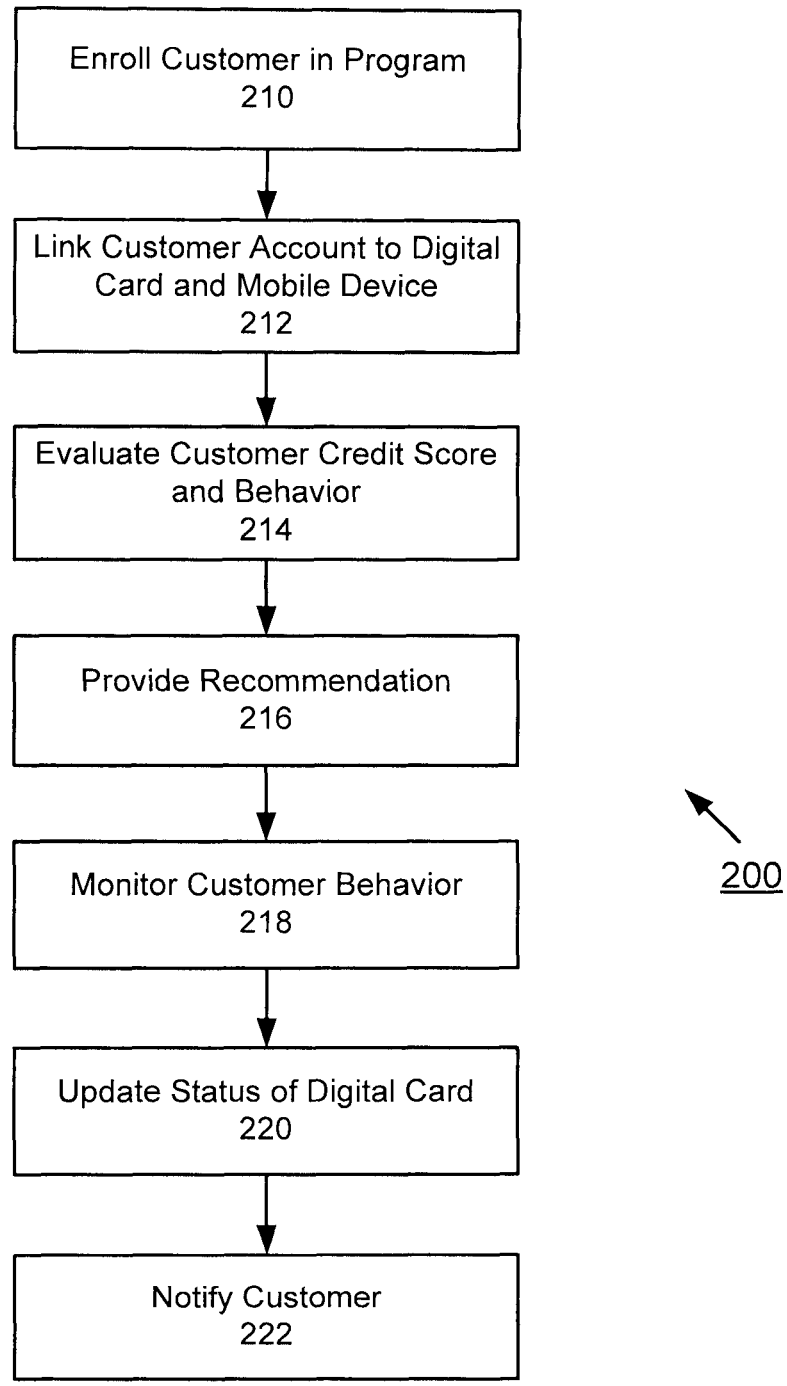
FIG. 2 is an exemplary diagram of a method for increasing the creditworthiness of an account holder, according to an embodiment of the present invention.

FIG. 2 is an exemplary diagram of a method for increasing the creditworthiness of an account holder, according to an embodiment of the present invention. At step 210, a customer may be enrolled in a creditworthiness program. At step 212, a digital card may be linked or associated with the customer's account and/or mobile device. At step 214, an embodiment of the present invention may evaluate the customer's current credit worthiness, behavior and/or activity. At step 216, an embodiment of the present invention may provide recommendations on credit and spend. At step 218, customer behavior may be monitored. At step 220, the customer's status may be updated. At step 222, the customer may be notified of the update. The order illustrated in FIG. 2 is merely exemplary. While the process of FIG. 2 illustrates certain steps performed in a particular order, it should be understood that the embodiments of the present invention may be practiced by adding one or more steps to the processes, omitting steps within the processes and/or altering the order in which one or more steps are performed. These steps will be described in greater detail below.

At step 210, a customer may be enrolled in a creditworthiness program. The program may be associated with a financial institution, bank, service provider, government agency, merchant, third party entity, etc. According to an exemplary scenario, this may be the first credit card for the customer. An embodiment of the present invention helps a customer (e.g., a first time credit card holder) to build up his or her credit score. An embodiment of the present invention may also help a customer who wants to restore his or her credit score, this may be in response to a bad investment, having to declare bankruptcy, etc. The invention may also help customers who want to improve their credit or simply maintain credit at a good level.

At step 212, a digital card may be linked or associated with the customer's account as well as a mobile or other device. An entity, e.g., financial institution, may provide an app that may be synchronized with the digital card. An embodiment of the present invention is directed to a digital card that changes its physical appearance as the customer progresses. For example, as the customer increases his or her credit worthiness, the physical appearance of the digital card may automatically change to reflect the customer's new status. In addition, the digital card may be automatically updated to provide new benefits, functions and features that may be personalized and tailored for the customer. The digital card may include smart card technology. For example, the digital card may include an integrated circuit and/or other embedded circuitry to provide various features, e.g., authentication, data storage, application processing, activity monitoring, data gathering, data analysis, etc.

At step 214, an embodiment of the present invention may evaluate the customer's current credit worthiness, behavior and activity. Based on an initial analysis, the digital card may provide functions and features that are aligned with the customer's current credit worthiness. For example, for a first time card holder, a basic level may be applied to the digital card. In this example, the digital card may include basic functions, including a low credit limit. For a customer that is desiring to restore his or her credit, the card may be given a different level of features and functions. The digital card may also be specific to a more sophisticated customer. For example, the sophisticated customer may receive investment advice and/or other information catered to the customer (e.g., high worth customer, etc.).

At step 216, an embodiment of the present invention may provide recommendations on credit and spend. The digital card may also include personalized features to help the customer stay on budget. For example, the digital card may have a daily spend limit where the digital card will not function if the customer attempts to exceed a daily spend limit. According to another example, the digital card may proceed with the purchase and provide a warning message to the customer that the purchase is above the customer's daily spend limit.

Within a card level, there may be different modes of use based on the customer's activity. The activity may include purchases made with the digital card as well as other activity. For example, the location of the customer may affect the functionality of the digital card. The customer may be notified that there are specials in the area and thereby direct or guide the customer to good deals and responsible spend opportunities. According to another example, the customer may indicate a desire to purchase a new bicycle. In response, the system may provide suggestions for places to purchase a bike within the customer's budget and also provide bike routes for the customer that will benefit the customer's daily commute to work, thereby saving the customer money in local transit, gas and/or other expenses. The system may also provide information concerning other benefits, including employee discounts for using public transaction, environmental benefits, tax credits, government assistance, etc.

At step 218, customer behavior may be monitored. An embodiment of the present invention may monitor the customer's spend activity on the digital card. Also, a customer's other activity may also be analyzed. For example, a customer's location, social media activity, recreational activity, subscription data, purchases, transactions, life events, affiliations, etc. may be monitored and used to identify customized benefits and features.

At step 220, the customer's status may be updated. When the customer reaches a next level, the associated digital card may be updated and start providing the next level benefits. For example, the digital card may change its appearance, color, design, logo, etc. when activated by the customer.

At step 222, the customer may be notified. The customer may receive a text or other message on the customer's mobile phone and/or other form of communication. The customer may also be alerted by a store clerk or other representative who made the transaction that got the customer to the next level.

An embodiment of the present invention is directed to a digital card with a biometric activation, such as fingerprint recognition, paired with a mobile device app. The customer may make peer-to-peer payments with devices with NFC and other enabled technology. By tapping or otherwise interfacing with a NFC card, funds may be transferred.

Another embodiment of the present invention is directed to providing customized benefits to cardholders. For example, the card levels may be upgraded based on a customer's responsible spending and timely payments. The digital card may graphically change with each upgrade, new functionality and/or services. An embodiment of the present invention provides convenience and unique experiences. Based on spending and responsible payments, a customer may choose from an array of services and benefits, earning more and more services with continued use.

Another embodiment of the present invention is directed to providing insights to the customer in the form of educational content on building credit. The customer may also receive alerts to keep from making credit mistakes.

Figure 3:
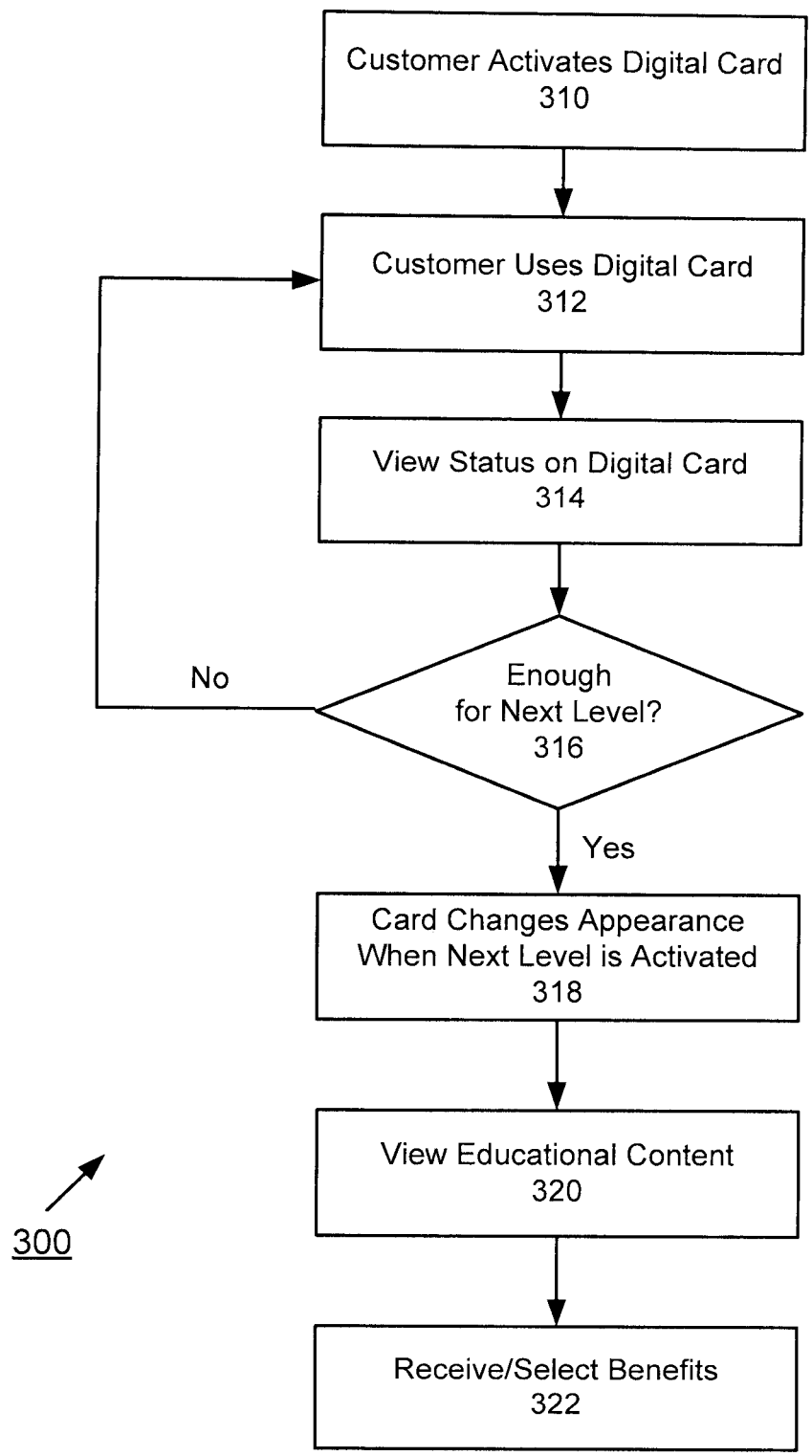
FIG. 3 is an exemplary diagram of a method for increasing the creditworthiness of an account holder, according to an embodiment of the present invention.
Figure 4:
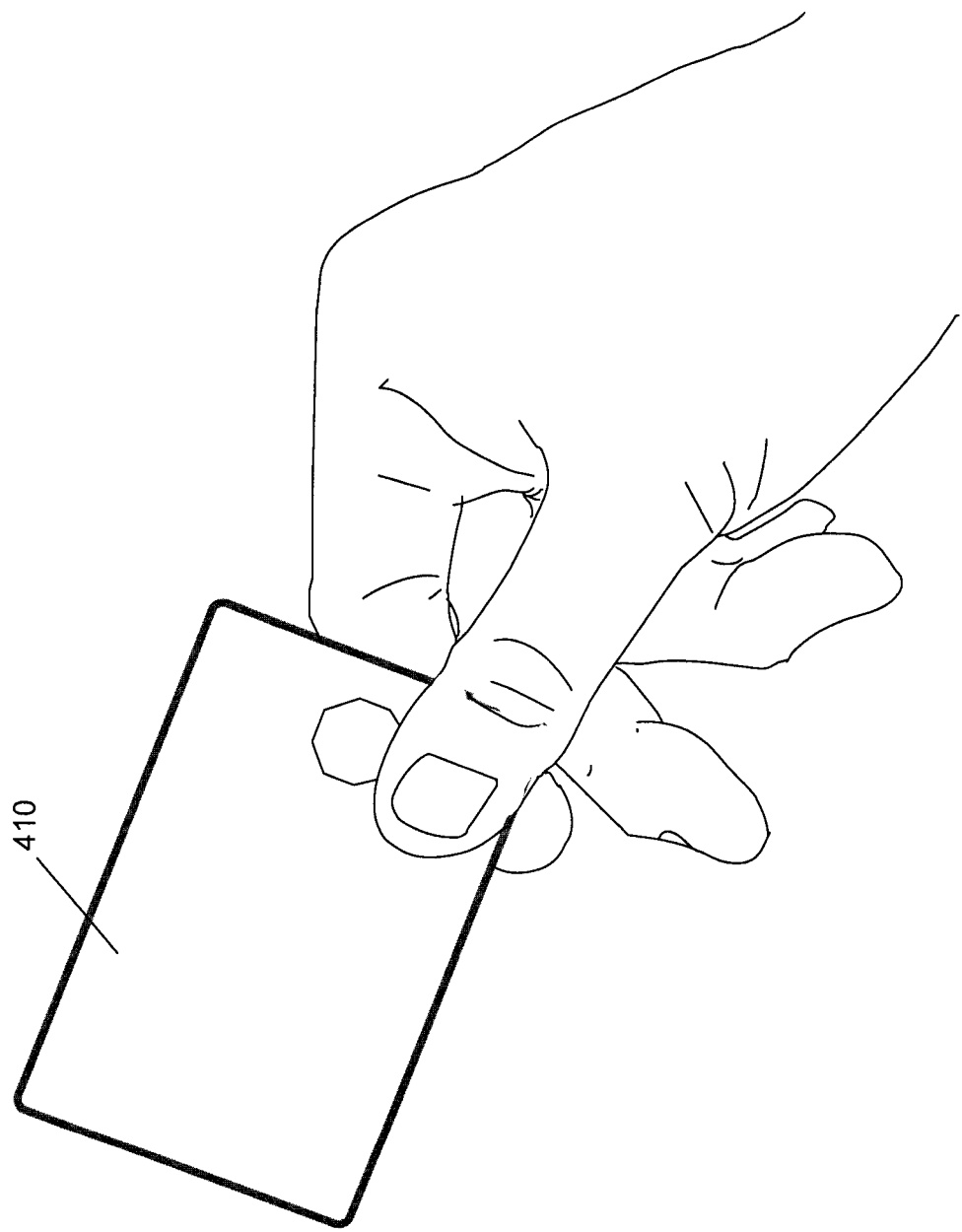
FIGS. 4-7 are exemplary illustrations of a digital card, according to an embodiment of the present invention.

FIG. 3 is an exemplary diagram of a method for increasing the creditworthiness of an account holder, according to an embodiment of the present invention. At step 310, the customer may activate a digital card. At step 312, the customer may make purchases with the digital card. At step 314, the customer may view status on the card. At step 316, a determination may be made whether the customer should be upgraded to the next card level. At step 318, if upgraded, the digital card may include an updated display. At step 320, the customer may view educational content. At step 322, the customer may receive and select personalized benefits and perks based on the customer's behavior. The order illustrated in FIG. 3 is merely exemplary. While the process of FIG. 3 illustrates certain steps performed in a particular order, it should be understood that the embodiments of the present invention may be practiced by adding one or more steps to the processes, omitting steps within the processes and/or altering the order in which one or more steps are performed. These steps will be described in greater detail below.

At step 310, the customer may activate a digital card. For example, the customer may activate a card through a fingerprint recognition feature. Other forms of identification and/or authentication may be implemented, including voice recognition, facial recognition, a personal identification number, etc. Also, a customer may perform a personalized swipe pattern or provide another personal input on the digital card. The customer's digital card may be paired or otherwise associated with the customer's mobile app on a mobile device.

At step 312, the customer may make purchases with the digital card. The customer may use the mobile app to identify local offers. The mobile app may provide recommendations that are aligned with the customer's current financial status. The recommendations may also provide explanation, tips, guides and/or other information that can assist a customer to be fiscally responsible when searching and redeeming offers. The customer may make purchases using the digital card, which may change its appearance when the card has been approved. The change in its appearance may signify to the customer that the payment has been approved. The card may temporarily change in color, icon and/or display message to indicate to the user whether the purchase was a good decision. For example, if a purchase puts the customer over his daily, weekly and/or monthly budget, the card may temporarily turn red to indicate a warning to the customer. The card may also reduce its limit to further assist the customer to stay within his or her budget. Other restrictions may be implemented to help the customer reach his or her financial goals.

The customer may make and receive payments from peer devices by interacting with the customer's mobile device and/or digital card. For example, if a friend owes the customer money, the friend may tap or otherwise interact with a NFC enabled card to the customer's mobile device to effectuate a transfer of funds.

At step 314, the customer may view status information on the card. If the customer is close to reaching a next level of card benefits, the digital card may provide a status icon (e.g., bar, chart, graphic, animation, message, etc.) that conveys that the customer is near his or her goal. The customer may view detailed status information on the customer's mobile device. For example, the mobile app may also provide categorized spending, level tracking, customized services and/or other information.

At step 316, a determination may be made as to whether the customer should be upgraded to the next card level. If the customer reaches a next level of credit worthiness, the digital card may change appearance when activated by the customer. If not, the customer may continue to make purchases at step 312 until the next level is reached.

At step 318, if upgraded, the digital card may include an updated display. For example, the digital card may change its appearance when activated by the customer. The original digital card may have been a blue card, but with the upgrade, the digital card may now display in black. According to another example, the digital card may include an icon that may change as the customer's status changes. The icon may change color, appearance, text, etc. Also, a customer's digital card may be synchronized with a mobile device, wearable, and/or other device that may also signify a change in the customer's status.

At step 320, the customer may view educational content. For example, educational content may include how much the customer should spend, lessons on how to be financially responsible, level checklists and customer status. The educational content may include personalized messages displayed on an associated device, e.g., mobile phone, tablet, computer, wearable, etc.

At step 322, the customer may receive and select personalized benefits and perks based on the customer's behavior. For example, the customer may receive offers for free services products, reward points, incentives, etc. An embodiment of the present invention provides convenient and unique experiences. Based on a customer's spending and payment history, the customer may receive an array of services and benefits, where the customer may earn more services with continued use and good behavior.

Figure 5:
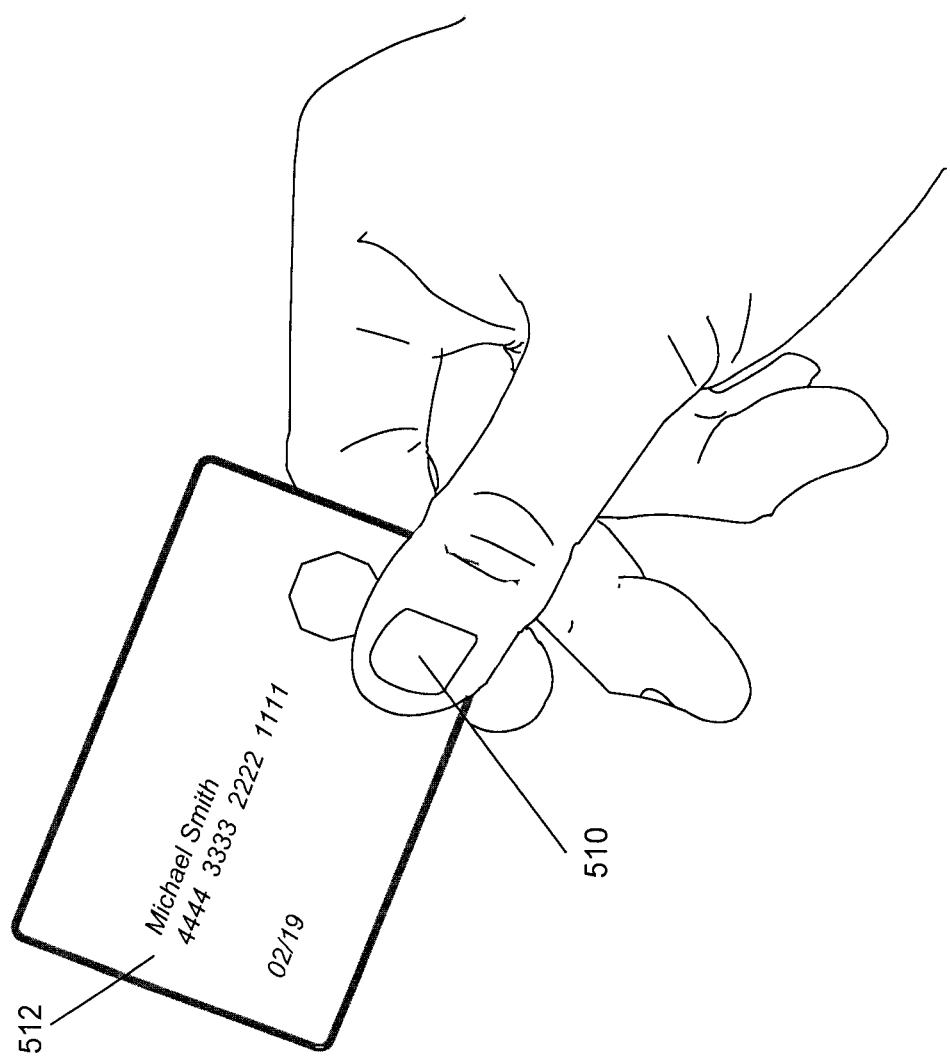

FIGS. 4-7 are exemplary illustrations of a digital card, according to an embodiment of the present invention. A customer may receive a basic blank card as shown by 410 in FIG. 4. The digital card may include a sensor that detects a customer's fingerprint to identify the customer. For example, the digital card may include a touch sensor, such as a capacitive touch feature, to detect the customer's fingerprint. Other recognition or sensor technology may be implemented to identify a customer in various ways. Upon customer recognition (e.g., fingerprint recognition, voice recognition, facial recognition, PIN/password, swipe pattern, device recognition, etc.), the digital card will get activated as shown in FIG. 5. Other types of recognition and/or authentication may be implemented. For example, the customer may be authenticated on another device (e.g., authentication via a customer's mobile device), point of sale device, kiosk, etc.

By placing a customer's print (e.g., thumb print, etc.) on the digital card, as shown by 510, the customer's card may be activated. The customer's name, credit card number, expiration date may be displayed as shown by 512 in FIG. 5. When the customer makes a payment for a purchase, the digital card may temporarily change to another color, e.g., green, to indicate that the payment was successful.

Figure 6:
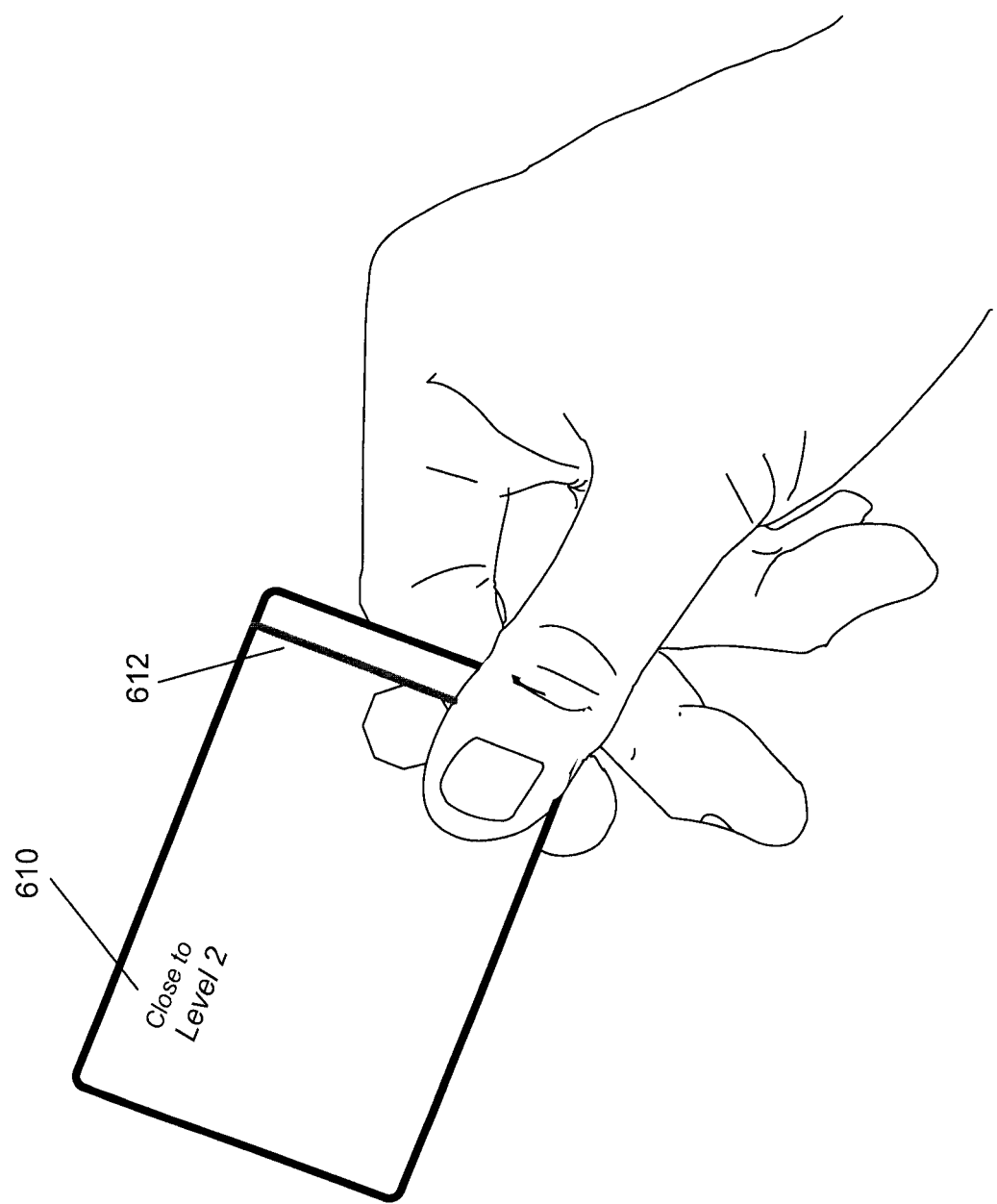

FIG. 6 is an exemplary digital card with a progress bar, according to an embodiment of the present invention. When a customer activates the digital card, a progress notification may be displayed. For example, while the customer may be currently at a first level, the digital card may display a progress graphic that shows the customer that he or she is close to reaching a second level. In the example shown in FIG. 6, the customer is notified that the customer is close to level 2, as shown by 610. A progress bar may be displayed at 612 to illustrate how close the user is to the next level. The digital card (or synchronized mobile device) may also indicate how many purchases and/or spend level are needed to reach the next level. Based on the customer's location, the digital card and/or the synchronized mobile device may further indicate to the customer of a nearby (fiscally responsible) purchase opportunity. The customer may also receive directions to the purchase opportunity. Moreover, the customer may receive a discount, benefit, coupon, merchant sponsored opportunity, etc. to further encourage the customer to make fiscally responsible purchase decisions.

When the customer reaches the second level, the customer may be notified that he has been upgraded to the next level based on customer usage and prompt payments. The customer may be informed that the digital card now has an increased credit limit (e.g., $500) as well as other benefits and features. The customer may also view tips, message, informational videos, etc. that explain credit limit and provides advice on how to build a good credit score. Based on the customer profile and/or other information, other goals and aspirations may be integrated.

Figure 7:
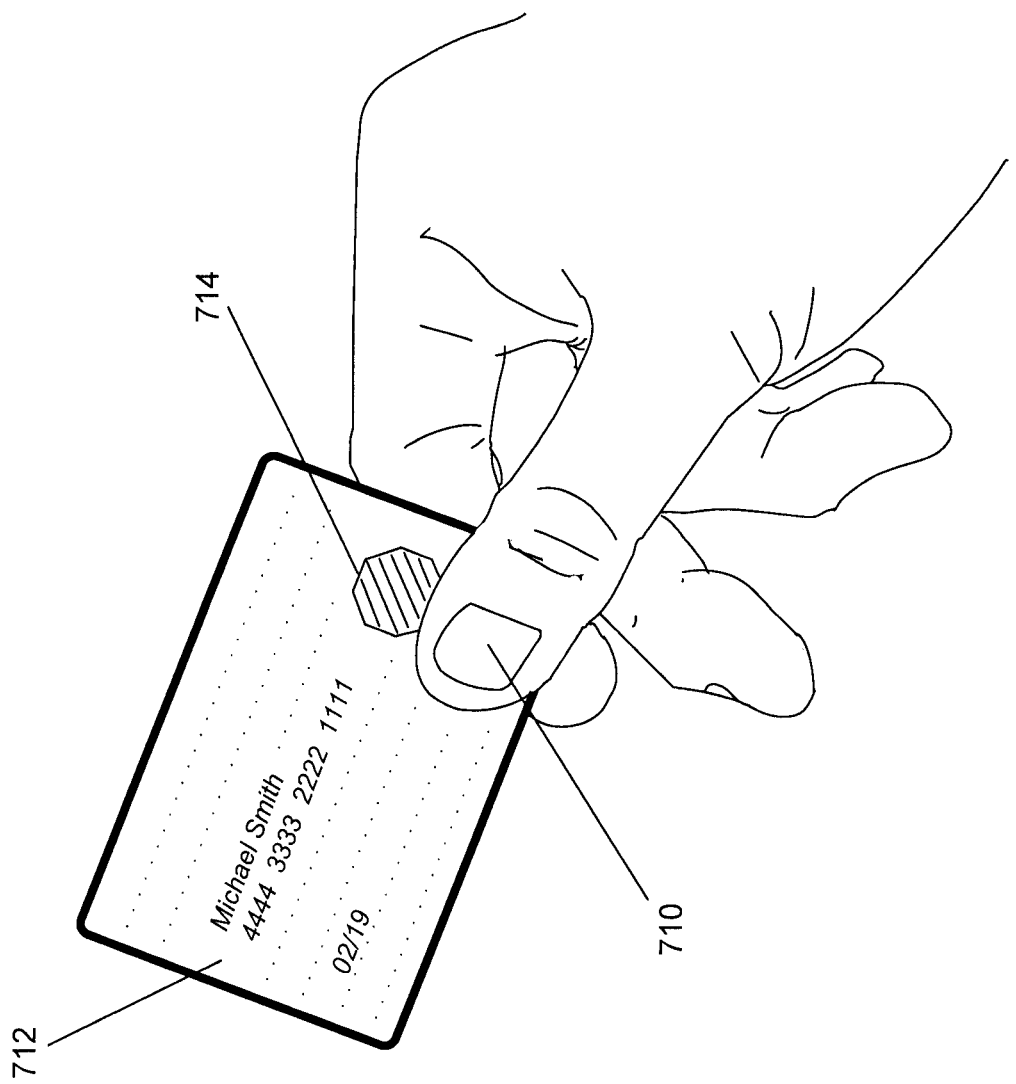

FIG. 7 is an exemplary illustration of a digital card at the next level, according to an embodiment of the present invention. Other graphical modifications and/or displays may be implemented. According to another example, an icon may appear to indicate that the card is now upgraded. When the customer activates the digital card (e.g., by placing his thumb or other finger on the corner of the card, as shown by 710), the digital card may display in a different color to indicate that the digital card now has level 2 benefits and features, as shown by 712. Other display modifications may be provided. According to another example, an icon shown by 714 may change color or appear differently based on the customer's level. The digital card may also include different graphics to communicate to the customer, such as icons, animations, voice activated messages, synchronized messages on an associated device, etc. Personalized messages may also be provided on a purchase receipt, at a point of sale device, kiosk, ATM, etc.

Figure 8:
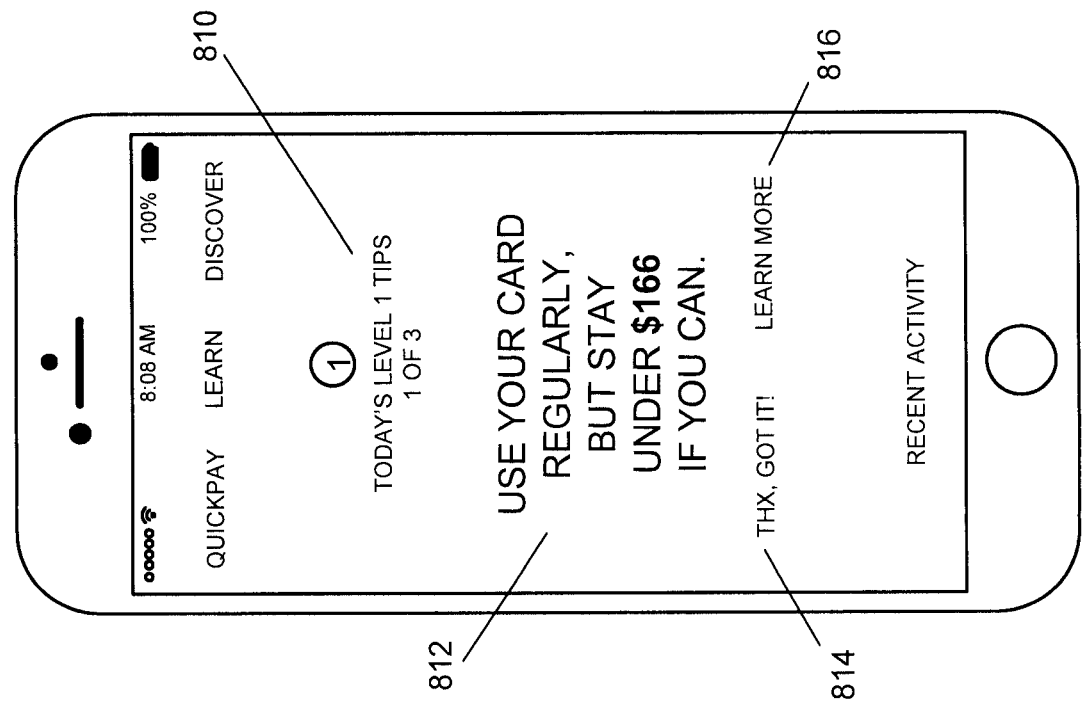

FIG. 8 is an exemplary screen shots illustrating credit education, according to an embodiment of the present invention. An embodiment of the present invention is directed to providing insights to the customer in the form of educational content on building credit. The customer may also receive alerts to keep from making credit mistakes. An embodiment of the present invention may also provide contextual insights. In this exemplary message, a customer is provided a personalized message to stay under a spend threshold. The threshold may be for a billing cycle, a month, a week, a day and/or other time period. The customer's current level is displayed at 810 and a personalized message at 812. The customer may acknowledge the message at 814. Also, the customer may learn more by selecting 816.

Figure 9:
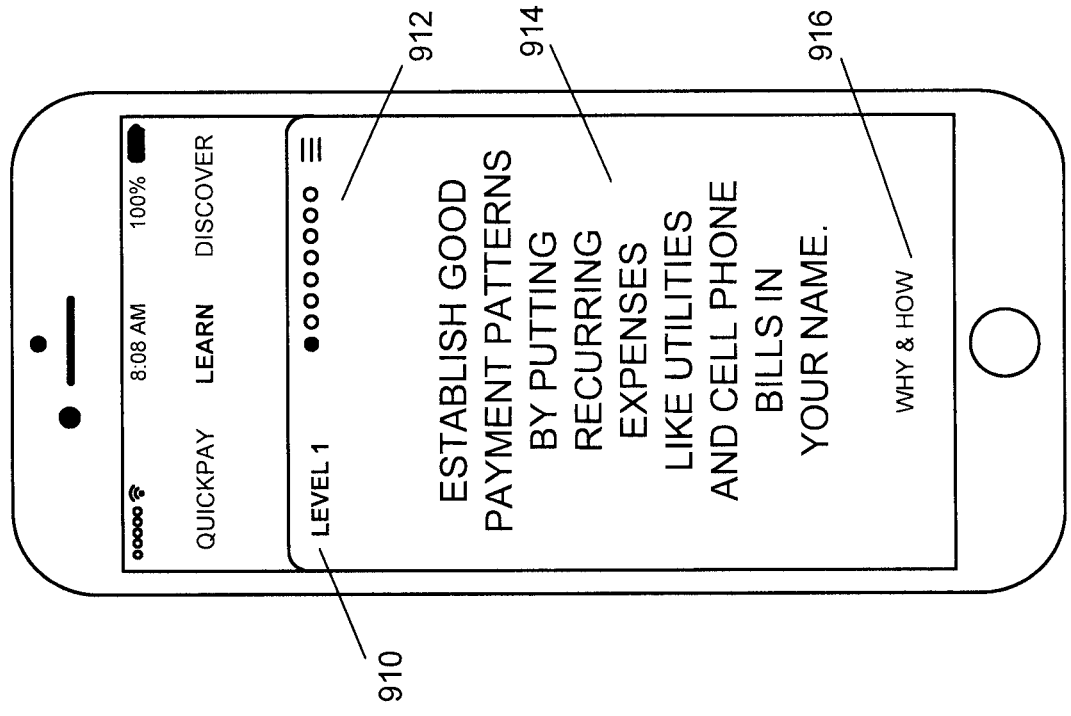
FIG. 8-10 are exemplary screen shots illustrating credit education, according to an embodiment of the present invention.

Additional detailed information may be provided, for example, as shown by FIG. 9. The customer's current level is shown at 910 and progress indicator at 912. In this example, the customer may view additional information at 914 and further request explanation at 916. The educational content may be interactive and customer specific. A customer's mobile device may provide more information at the customer's request and at the customer's desired level of detail and explanation.

Figure 10:
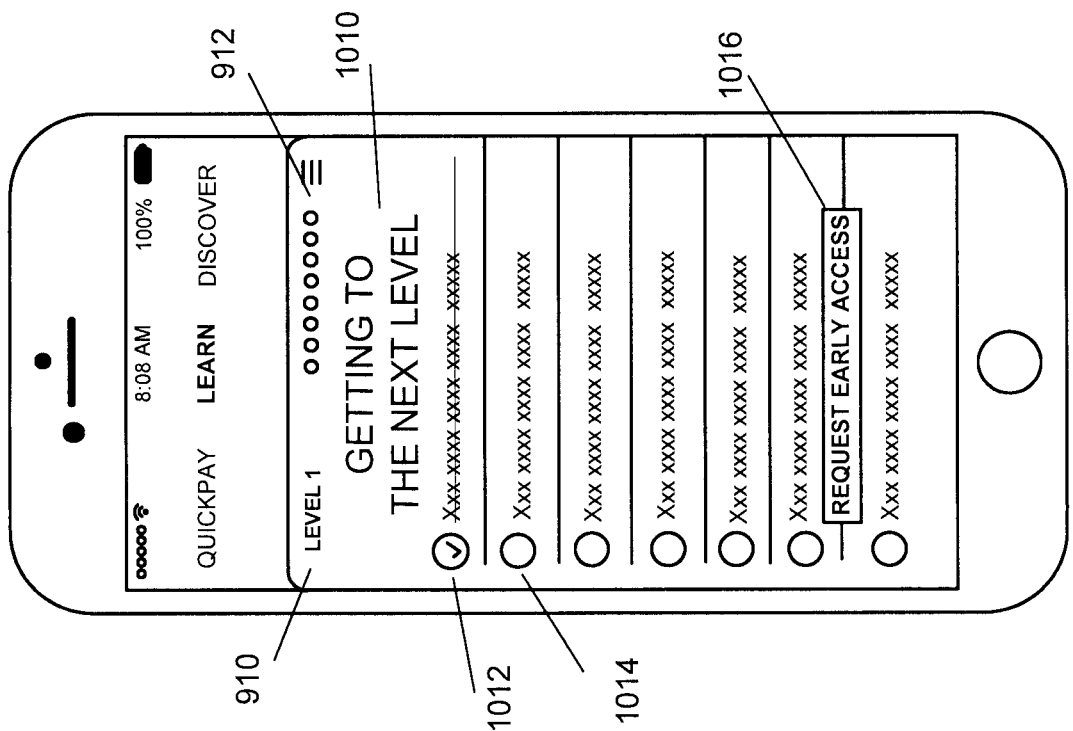

In addition, the customer may also receive detailed information on how the customer can advance to the next level, as shown in FIG. 10. This may be in the form of a "how to" tutorial, checklist, etc. For example, the customer may view action items for getting to the next level at 1010. Also, action items may be checked off at 1012 and listed for the customer to view at 1014, for example. The customer may also request an early access to the next level at 1016. For example, a customer may be able to unlock early access by demonstrating exemplary financial behavior. This may take many forms, such as linking another deposit account to show high income low expenses or linking a home loan that shows regular payments. The customer may also receive good example purchases, habits, etc. An embodiment of the present invention may provide various forms of education, including lessons, interactive tutorials, reminders, warnings, encouragement, video content, level checklist, etc.

Figure 11:
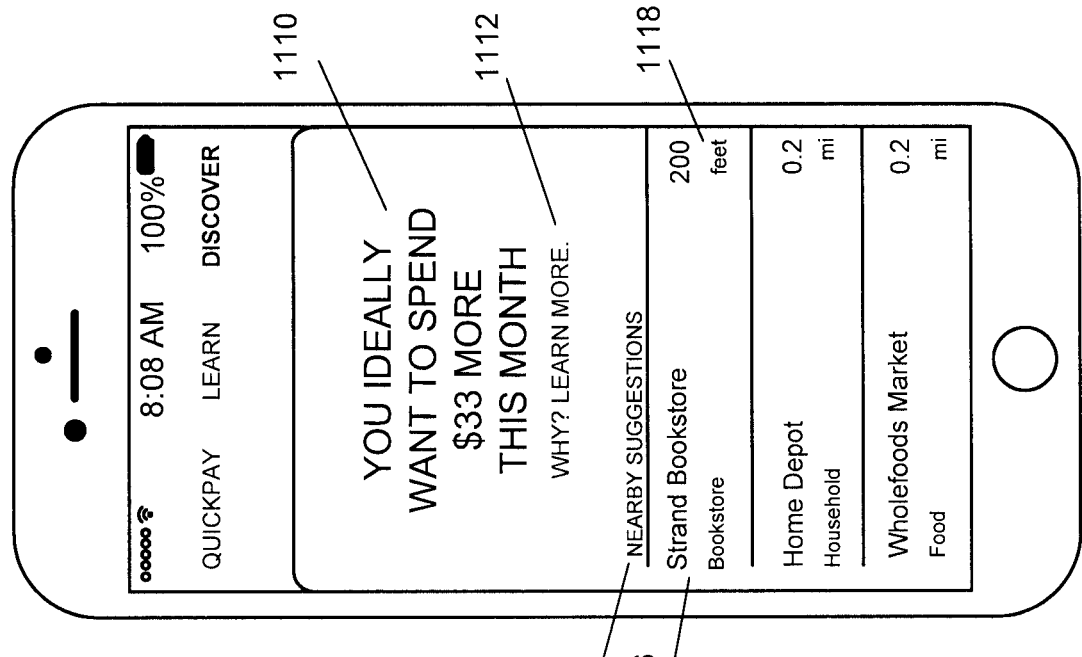
FIG. 11 is an exemplary screen shots illustrating contextual tips, according to an embodiment of the present invention.

FIG. 11 is an exemplary screen shots illustrating contextual tips, according to an embodiment of the present invention. A customer may receive nearby suggestions to help the customer make sound purchase decisions. A personalized message may be provided at 1110. Additional details may be accessed via link 1112. Nearby suggestions may be displayed at 1114, including merchant name and type at 1116 and distance to travel at 1118. Additional geographic information, including maps, directions, etc. may be provided as well.

Figure 12:
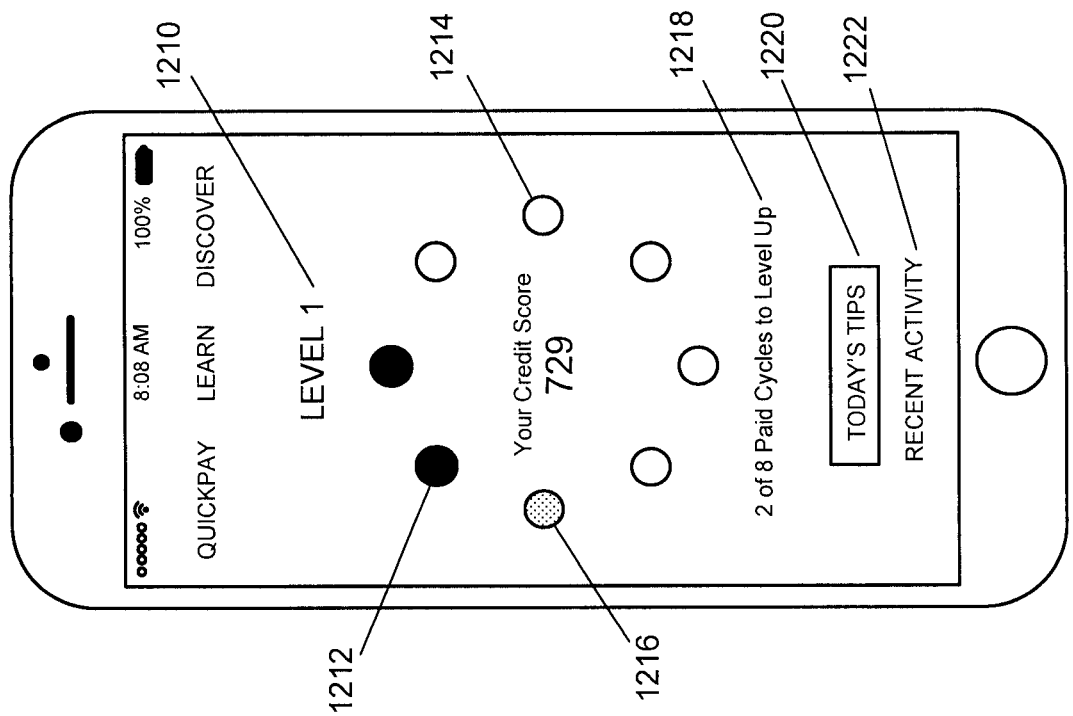
FIG. 12 is an exemplary screen shots illustrating customer status, according to an embodiment of the present invention.

FIG. 12 is an exemplary screen shots illustrating customer status, according to an embodiment of the present invention. An embodiment of the present invention may provide status updates, such as live progression. For example, a customer is currently at level 1, as shown at 1210. Various graphics may be used to indicate progress. In FIG. 12, an exemplary progress graphic is shown by 1212, 1214 and 1216. In this example, graphic 1212 shows customer progress. The customer has completed 2 out of the 8 paid cycles to level up, as shown at 1218. Graphic 1216 indicates that the customer is almost ready to complete 3 of the 8 cycles. Other customer progress activities may be displayed. Also, educational information may be provided at 1220. Customer historical activity may be accessed at 1222. Other status information, such as a customer's current credit score, may be shown. The progress data may be further customized to encourage fiscally responsible behavior from the customer.

Figure 13:
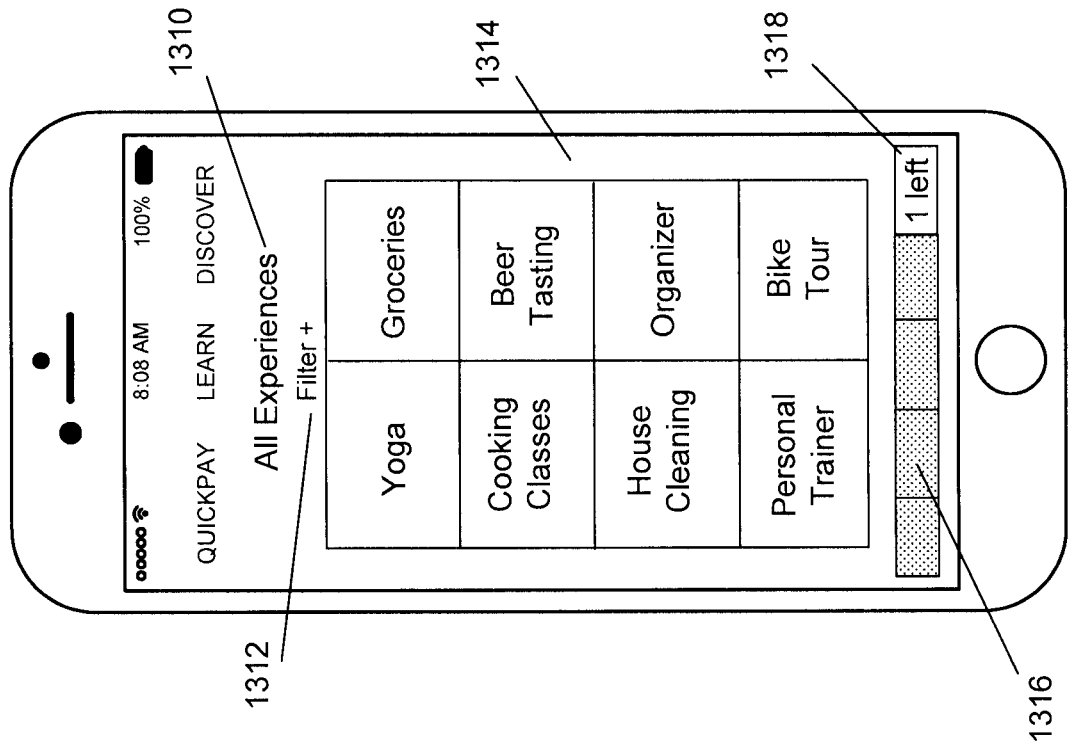
FIG. 13 is an exemplary screen shots illustrating customer benefits, according to an embodiment of the present invention.

FIG. 13 is an exemplary screen shots illustrating customer benefits, according to an embodiment of the present invention. Based on spending and responsible payment and other behavior, the customer may choose from an array of services, earning more services and benefits with continued use. For example, based on a customer's current behavior, the customer may receive five free services per month. As shown by status bar 1316, the customer has redeemed four free services and has one left as shown by 1318. Customer experiences may be shown at 1310 and further sorted and searched by filter 1312. The customer may view a graphical display of services at 1314. Upon selection, the customer may schedule deliveries and services for the selected services.

Although the foregoing description has focused primarily on a financial institution assembling relevant data sets, processing the data, and sending the relevant data at appropriate times to its customer, the system may be operated and maintained by other types of commercial entities who may configure the system to provide similar advantages to their customers. In additional, while the foregoing description has focused primarily on the customer spend, the principles of the invention can be applied to other vendors and entities where the operating entity can assemble and provide relevant, timely information to enhance the customer's experience.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

Data and information maintained by the servers shown by FIG. 1 may be stored and cataloged in one or more databases, which may comprise or interface with a searchable database and/or a cloud database. The databases may comprise, include or interface to a relational database. Other databases, such as a query format database, a Standard Query Language (SQL) format database, a storage area network (SAN), or another similar data storage device, query format, platform or resource may be used. The databases may comprise a single database or a collection of databases. In some embodiments, the databases may comprise a file management system, program or application for storing and maintaining data and information used or generated by the various features and functions of the systems and methods described herein.

Communications network, e.g., 110 in FIG. 1, may be comprised of, or may interface to any one or more of, for example, the Internet, an intranet, a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

Communications network, e.g., 110 in FIG. 1, may also comprise, include or interface to any one or more of a Wireless Application Protocol (WAP) link, a Wi-Fi link, a microwave link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based radio frequency link. Communications network 110 may further comprise, include or interface to any one or more of an RS-232 serial connection, an IEEE-1394 (Firewire) connection, a Fibre Channel connection, an infrared (IrDA) port, a Small Computer Systems Interface (SCSI) connection, a Universal Serial Bus (USB) connection or another wired or wireless, digital or analog interface or connection.

In some embodiments, communication network, e.g., 110, may comprise a satellite communications network, such as a direct broadcast communication system (DBS) having the requisite number of dishes, satellites and transmitter/receiver boxes, for example. The communications network may also comprise a telephone communications network, such as the Public Switched Telephone Network (PSTN). In another embodiment, communication network 110 may comprise a Personal Branch Exchange (PBX), which may further connect to the PSTN.

Although examples of a mobile device 132, 134 and a personal computing device 136 are shown in FIG. 1, exemplary embodiments of the invention may utilize other types of communication devices whereby a user may interact with a network that transmits and delivers data and information used by the various systems and methods described herein. The mobile device and personal computing device may include a microprocessor, a microcontroller or other device operating under programmed control. These devices may further include an electronic memory such as a random access memory (RAM), electronically programmable read only memory (EPROM), other computer chip-based memory, a hard drive, or other magnetic, electrical, optical or other media, and other associated components connected over an electronic bus, as will be appreciated by persons skilled in the art. The mobile device and personal computing device may be equipped with an integral or connectable liquid crystal display (LCD), electroluminescent display, a light emitting diode (LED), organic light emitting diode (OLED) or another display screen, panel or device for viewing and manipulating files, data and other resources, for instance using a graphical user interface (GUI) or a command line interface (CLI). The mobile device and personal computing device may also include a network-enabled appliance or another TCP/IP client or other device. The mobile device 132, 134 and personal computing device 136 may include various connections such as a cell phone connection, WiFi connection, Bluetooth connection, satellite network connection, and/or near field communication (NFC) connection, for example.

As described above, FIG. 1 includes a number of servers 122, 128 and user communication devices 132, 134, 136, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers in FIG. 1 may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, dBase, Forth, Fortran, Java, Modula-2, Pascal, Prolog, RUM Visual Basic, and/or JavaScript. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices 132, 134 or personal computing device 136. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor.

The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although, the examples above have been described primarily as using a software application ("app") downloaded onto the customer's mobile device, other embodiments of the invention can be implemented using similar technologies, such as transmission of data that is displayed using an existing web browser on the customer's mobile device.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A digital card having a front side and a back side, the digital card comprising:
    a memory that stores data associated with an account and a user;
    a sensor that detects a user's fingerprint to identify the user;
    a front display on the front side of the digital card that displays an identification associated with the user and a card number upon activation of the digital card responsive to the user's fingerprint;
    a microprocessor, coupled to the memory, sensor and the front display, programmed to perform the following:
    detect spend activity on the digital card, wherein the digital card is associated with a first level having a first credit limit;
    identify the user's credit worthiness based at least in part on monitored spend activity;
    determine whether the user qualifies to advance to a next level based on the monitored spend activity and user payment activity, wherein the next level represents a credit limit that is different from the first credit level; and
    automatically update the front display on the digital card responsive to the user's credit worthiness and the monitored spend activity wherein the front display provides a status icon that reflects the user's progress and advancement to the next level, wherein the next level comprises a higher user credit limit.

2. The digital card of claim 1, wherein the digital card is associated with a mobile app that executes on a mobile device associated with the user and linked to the account.

3. The digital card of claim 2, wherein the mobile app provides a customized recommendation for spending with the digital card.

4. The digital card of claim 2, wherein the mobile app provides customized educational information concerning the user's credit worthiness.

5. The digital card of claim 1, wherein the microprocessor is further programmed to: determine the user's credit score and behavior.

6. The digital card of claim 1, wherein the front display of the digital card changes its appearance with an automatic update.

7. The digital card of claim 1, wherein the microprocessor is further programmed to: automatically update the front display on the digital card responsive to the user's social media activity.

8. The digital card of claim 1, wherein the microprocessor is further programmed to: update one or more features of the digital card responsive to the user's credit worthiness, spend activity and payment activity.

9. A method for implementing a digital card having a front side and a back side, the digital card comprising a memory that stores data associated with an account and a user; a sensor that detects a user's fingerprint to identify the user; a front display on the front side of the digital card that displays an identification associated with the user and a card number upon activation of the digital card responsive to the user's fingerprint; and a microprocessor, coupled to the memory, sensor and a front display, the method comprising the steps of:
    detecting, via the sensor, a user's fingerprint to identify the user;
    displaying, via the front display, an identification associated with the user and a card number upon activation of the digital card responsive to the user's fingerprint;
    detecting spend activity on the digital card, wherein the digital card is associated with a first level having a first credit limit;
    identifying the user's credit worthiness based at least in part on monitored spend activity;
    determine whether the user qualifies to advance to a next level based on the monitored spend activity and user payment activity, wherein the next level represents a credit limit that is different from the first credit level; and
    automatically updating the front display on the digital card responsive to the user's credit worthiness and the monitored spend activity wherein the front display provides a status icon that reflects the user's progress and advancement to the next level, wherein the next level comprises a higher user credit limit.

10. The method of claim 9, wherein the digital card is associated with a mobile app that executes on a mobile device associated with the user and linked to the account.

11. The method of claim 10, wherein the mobile app provides a customized recommendation for spending with the digital card.

12. The method of claim 10, wherein the mobile app provides customized educational information concerning the user's credit worthiness.

13. The method of claim 9, further comprising the step of: determining the user's credit score and behavior.

14. The method of claim 9, wherein the front display of the digital card changes its appearance with an automatic update.

15. The method of claim 9, further comprising the step of: automatically updating the front display on the digital card responsive to the user's social media activity.

16. The method of claim 9, further comprising the step of: updating one or more features of the digital card responsive to the user's credit worthiness, spend activity and payment activity.

* * * * *